(12) United States Patent
Carceroni et al.

(10) Patent No.: US 9,471,679 B2
(45) Date of Patent: Oct. 18, 2016

(54) SYSTEMS AND METHODS FOR IMPROVED COVERAGE OF INPUT MEDIA IN CONTENT SUMMARIZATION

(71) Applicant: Google Inc., Mountain View, CA (US)

(72) Inventors: Rodrigo Carceroni, Mountain View, CA (US); Pannag Raghunath Sanketi, Fremont, CA (US); Marius Renn, San Jose, CA (US); Ruei-sung Lin, Redwood City, CA (US); Wei Hua, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 303 days.

(21) Appl. No.: 14/194,518

(22) Filed: Feb. 28, 2014

(65) Prior Publication Data
US 2015/0120733 A1 Apr. 30, 2015

Related U.S. Application Data

(60) Provisional application No. 61/897,206, filed on Oct. 29, 2013.

(51) Int. Cl.
*G06F 17/30* (2006.01)

(52) U.S. Cl.
CPC .............................. *G06F 17/30843* (2013.01)

(58) Field of Classification Search
None
See application file for complete search history.

(56) References Cited

U.S. PATENT DOCUMENTS

2011/0129159 A1* 6/2011 Cifarelli .............. G06F 17/3028
382/224

* cited by examiner

*Primary Examiner* — Belix M Ortiz Ditren
(74) *Attorney, Agent, or Firm* — Troutman Sanders LLP; James E. Shutz; Christopher C. Close, Jr.

(57) ABSTRACT

The disclosed technology includes techniques for improved content coverage in automatically-generated content summaries. The technique may include clustering a set of input content, determining diffusion for each cluster, and selecting representatives of each cluster to optimize other secondary metrics. Various types of input content may be used, including groups of images, video clips, or other multimedia content. Contiguous content may be manually or programmatically divided into discrete portions before clustering, for example, a lengthy video divided into a number of short clips. In some implementations, the disclosed technique may be implemented effectively on a mobile device. In other words, the processing required may be computationally feasible for execution on a smartphone or similar device.

20 Claims, 5 Drawing Sheets

SYSTEMS AND METHODS FOR IMPROVED COVERAGE OF INPUT MEDIA IN CONTENT SUMMARIZATION

CROSS-REFERENCE TO RELATED APPLICATIONS

This application claims priority to, and the benefit under 35 U.S.C. §119(e), of U.S. Provisional Patent Application No. 61/897,206, filed 29 Oct. 2013, the entire contents and substance of which are hereby incorporated by reference as if fully set forth below.

BACKGROUND

In recent years, there has been a proliferation of consumer digital cameras and camera-equipped mobile devices (e.g., smartphones and tablets). The cost of such devices and digital media storage continue to decrease, while usage continues to increase. Accordingly, there has been an explosion in the amount of digital image and video data produced and stored. However, much of this data consists of long-running or unedited content such as unsorted photo collections, home videos, or surveillance feeds.

A photo or video summary can provide a visual synopsis, or a "trailer" of sorts, to quickly reveal the subject matter of media content and highlight the more salient portions. When browsing digital content, for example, on a social content-sharing platform, being able to identify quickly the more interesting parts of a video can save significant time. Moreover, video summaries can provide a compact but rich feature set for activity-recognition heuristics.

To create compact summaries from unedited content, existing summarization techniques may prioritize selection of higher quality content or segments with significant motion or activity. However, conventional techniques may overemphasize these factors to the detriment of providing comprehensive coverage of the input content. Moreover, conventional techniques are generally too computationally intensive to be effectively implemented on computationally constrained mobile devices. Accordingly, content captured at a camera-equipped mobile device often must be offloaded to another computing device for effective summarization.

SUMMARY

Some or all of the above deficiencies may be addressed by certain implementations of the disclosed technology. Certain implementations include techniques for improved content coverage in automatically-generated content summaries Moreover, in some implementations, the techniques may be implemented effectively on computationally constrained mobile devices, such as smartphones, tablets, and digital cameras. Accordingly, implementations of the disclosed technology may reduce time and user effort expended when browsing media content, or aid activity-recognition techniques.

According to an example implementation, a method is provided. The method may include receiving content to be summarized. The method may further include defining, based on the content, a plurality of content segments. The method may yet further include, defining, based on a determined similarity between content segments from the plurality of content segments, a plurality of content segment clusters. Each content segment cluster from the plurality of content segment clusters may be associated with one or more content segments from the plurality of content segments. The method may also include, determining a plurality of representative content segments including a representative content segment for each content segment cluster from the plurality of content segment clusters. For a first content segment cluster from the plurality of content segment clusters, a first representative content segment may be determined by calculating a diffusion value for each content segment associated with the first content segment cluster, and responsive to calculating the diffusion value for each content segment, selecting, as the first representative content segment for the first content segment cluster, the content segment with a highest calculated diffusion value. The diffusion value may be calculated based on a quality value associated with the respective content segment and a proximity of the respective content segment with other content segments associated with the first content segment cluster. The method may include selecting, to be included in a summary of the content, one or more representative content segments from the plurality of representative content segments, wherein a magnitude of the one or more representative content segments exceeds a predetermined threshold.

According to another example implementation, a computer readable medium is provided. The computer readable medium may store instructions that, when executed by at least one processor in a system, cause the processor to perform a method substantially similar to the method described hereinabove.

According to yet another example implementation, a system is provided. The system may include a memory operatively coupled to a processor and configured for storing data and instructions that may be executed by the processor. When executed, the system may be caused to perform a method substantially similar to the method described hereinabove.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
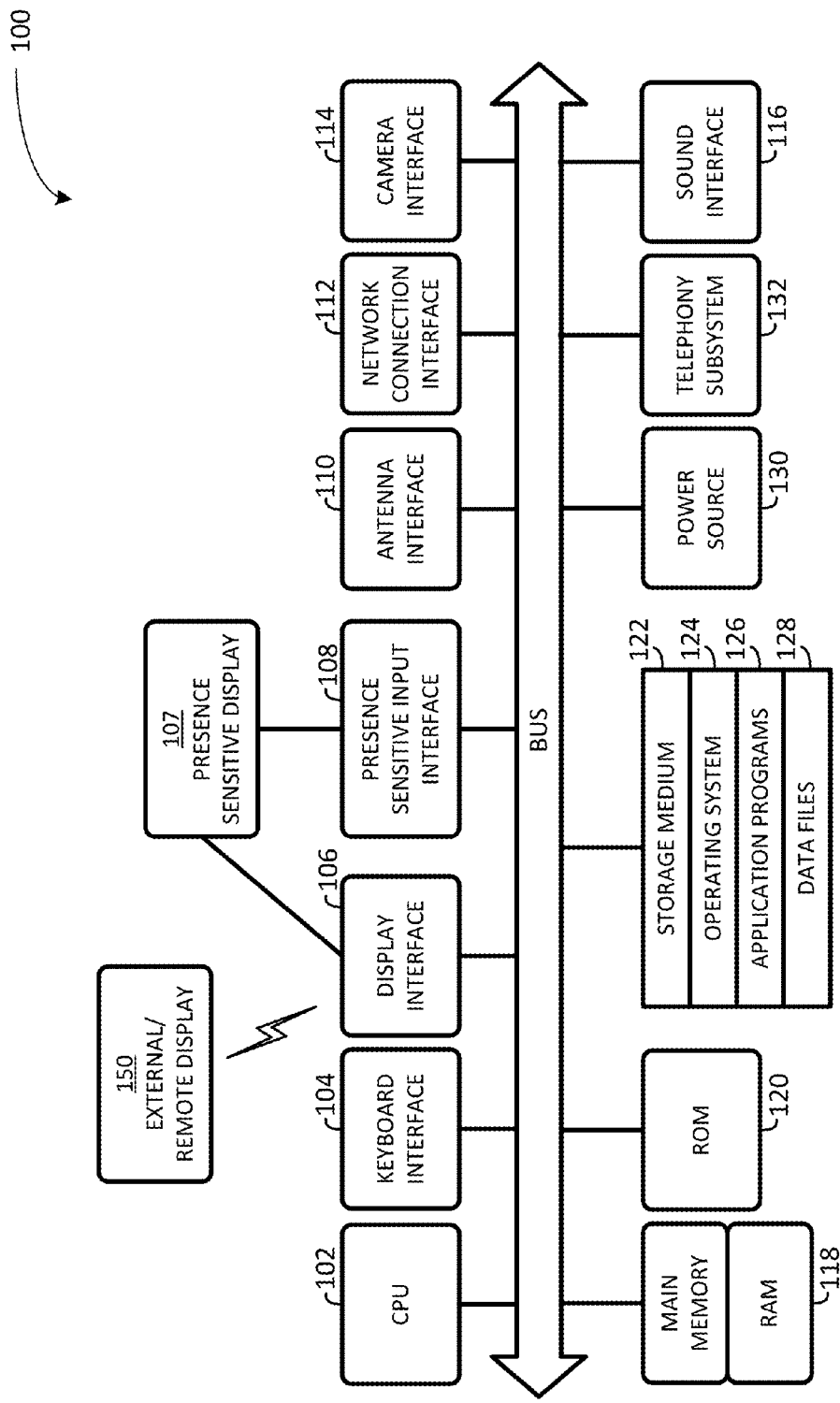
FIG. 1 depicts a block diagram of illustrative computing device architecture 100, according to an example implementation.

Implementations of the disclosed technology include techniques for improved content coverage in automatically-generated content summaries. According to certain implementations, content coverage may be improved by grouping elements, e.g., subsets of images from a collection or segments of a video sequence, into clusters based on similarity between the elements; determining the diffusion in each cluster to reveal the optimal "representative" of each cluster; and selecting a subset of the cluster representatives providing a desired length or duration of summary while improving or maximizing secondary factors.

Various types of input content may be used with implementations of the disclosed technology, including groups of images, video clips, or other multimedia content such as text and audio. In some implementations, contiguous content may manually or programmatically be divided into discrete portions, for example, a lengthy video divided into a number of short clips.

In some implementations, the disclosed techniques may be implemented effectively on a computationally-constrained mobile device. In other words, the processing required may be computationally feasible for execution on a smartphone or similar device.

Some implementations of the disclosed technology will be described more fully hereinafter with reference to the accompanying drawings. The disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for improved content coverage in automatically-generated content summaries, and will now be described with reference to the accompanying figures.

Figure 2:
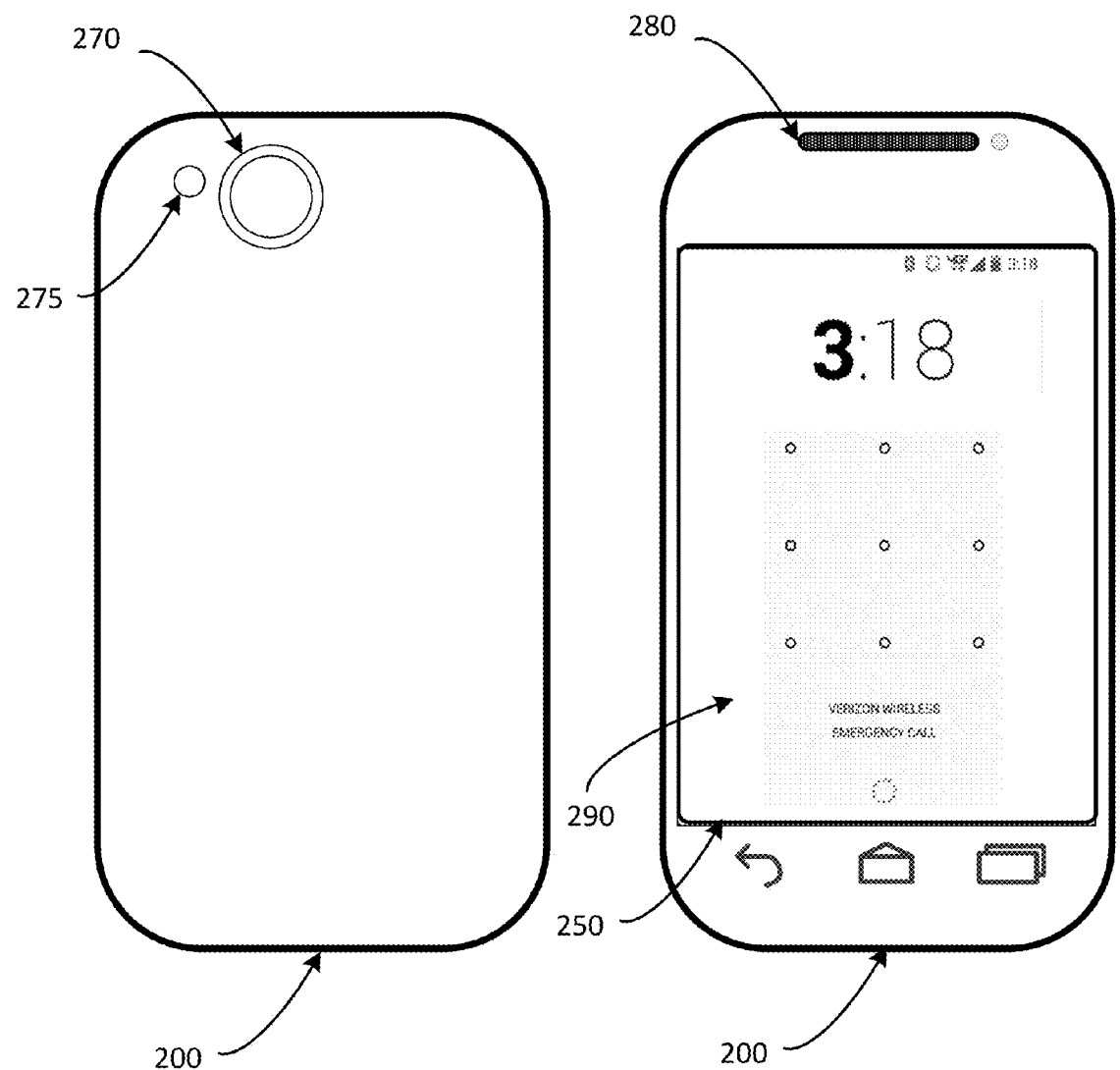
FIG. 2 depicts an illustration of a computing device 200, according to an example implementation.

FIG. 1 depicts a block diagram of illustrative computing device architecture 100, according to an example implementation. Certain aspects of FIG. 1 may be embodied in a computing device 200 (for example, a mobile computing device as shown in FIG. 2). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to certain some embodiments of the disclosed technology, the display interface 106 may be directly connected to a local display, such as a touch-screen display associated with a mobile computing device. In another example embodiment, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some embodiments, the display interface 106 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example embodiment, the computing device architecture 100 may include a presence-sensitive display interface 107 for connecting to a presence-sensitive display. According to certain some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. According to certain embodiments, a camera interface 114 is provided that acts as a communication interface and provides functions for capturing digital images from a camera. According to certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the device 100 to transmit and receive sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display. In another example embodiment, the term computing device, as used herein, may refer to a mobile computing device 200, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device 200 may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

FIG. 2 depicts an illustration of a computing device 200, according to an example implementation. As shown in FIG. 2, the computing device may be a mobile computing device, for example, a smartphone or a tablet. The mobile computing device may have a built-in or integrated display 250 for presenting a graphical user interface (GUI) 290 or other user interface. The display may be combined with a presence sensitive input device to form a touch-sensitive or presence-sensitive display for receiving user input from a stylus, finger, or other means of gesture input. In some implementations, the mobile computing device may also include or be associated with a sound producing device 250, such as a speaker, piezoelectric buzzer, or the like.

The mobile computing device 200 may be in communication with an image capture device 270 for capturing or recording content. As shown in FIG. 2, the computing device may include a built-in or internal image capture device, for example, a camera or CCD. The image capture device may include or be associated with an illumination device 275, for example, a flash device or IR beacon. In another example implementation, the image capture device may be external to the computing device and in communication with the computing device, for example, through a direct connection, or wireless coupling.

In certain implementations, the mobile computing device 200 may include one or more antennas or radios for wireless communication. These may include antennas for receiving GPS, Wi-Fi, or other radio communications. In addition, the mobile computing device may include one or more sensors for detecting, for example and without limitation, temperature, pressure, altitude, magnetic heading, etc.

Research has shown that human users tend to maximize value along three principle axes when creating summaries of digital photo and video content: quality, diversity, and coverage. Conventional techniques for automatic generation of content summaries often fail to address these aspects sufficiently, and in particular, do not address content coverage. In contrast, implementations of the present disclosed technology include techniques for improved content coverage in automatically-generated content summaries.

When summarizing media content, it may be useful to consider the breadth of coverage of the summarized content in addition to other factors, such as intrinsic value (referred to herein as "quality" or "interestingness") or diversity of the input content. For example, if a user has captured fifty images or videos, with twenty of those images or videos featuring a particular subject-matter or object, at least a portion of the twenty may be desirable to be included in a summary of the captured fifty images or videos—even if none of the twenty are determined to have a high quality or interestingness value when compared with the rest of the content. Thus, if a user has captured content disproportionately directed to a particular subject, that subject is likely inherently meaningful/interesting to that user and should be included in a summary of the content—even if conventional techniques for generating content summaries might indicate otherwise.

According to certain implementations, content coverage may be improved by grouping elements, e.g., subsets of images from a collection or segments of a video sequence, into clusters based on similarity between the elements; determining the diffusion in each cluster to reveal the optimal "representative" of each cluster; and selecting a subset of the cluster representatives providing a desired length or duration of summary while improving or maximizing secondary factors. In an alternate implementation, quality, diversity and coverage may be instead optimized in a single step using a global optimization technique, for example, Determinantal Point Process optimization. Such alternate implementations, however, may be too computationally intensive to run on computing devices with limited processing power, such as smartphones, tablets, and digital cameras.

Clustering Elements

In some implementations, the input content may be pre-divided into discrete elements, such as individual photos from a vacation or a series of short clips. In another implementation, the input content may be broken into smaller elements as a part of summarization, for example, dividing a fifteen-minute video into a number of five- to ten-second clips. The elements may then be clustered or grouped by similarity, according to various metrics such as quality, content similarity, temporal similarity, etc. Clustering the content elements may improve or ensure diversity in a generated content summary. In some implementations, the actual data embodying the content may not necessarily be altered. Instead, portions of content may be compared in-place. Techniques for dividing content into subsets and grouping the subsets into clusters by similarity are known in the art and are not further discussed herein. Quality may refer to any of a variety of factors determined to be interesting to human users, including detected motion, objects, or faces, color characteristics, content fidelity, or the presence of audio features, etc.

In some implementations, there is no condition on a minimum or maximum number of clusters. In another implementation, the number of clusters may be dictated by a desired target summary length or size, e.g., duration of summary or number of images. Accordingly, in such implementations, the number of clusters should be sufficiently large such that, after choosing a representative clip from one or more clusters, the total magnitude (e.g., duration, number of images, etc.) of the chosen representative elements will meet or exceed a target magnitude.

In another implementation, a particular stopping distance criterion may be specified. For example, a limit on the number of clusters may be specified as a percent of the total number of input images or clips. However, this approach may not work well with diverse albums. In another example, clustering may be stopped based on the distance or similarity between clusters. In such implementations, certain coverage as well as diversity may be ensured.

Selecting a Cluster Representative by Diffusion

Figure 3:
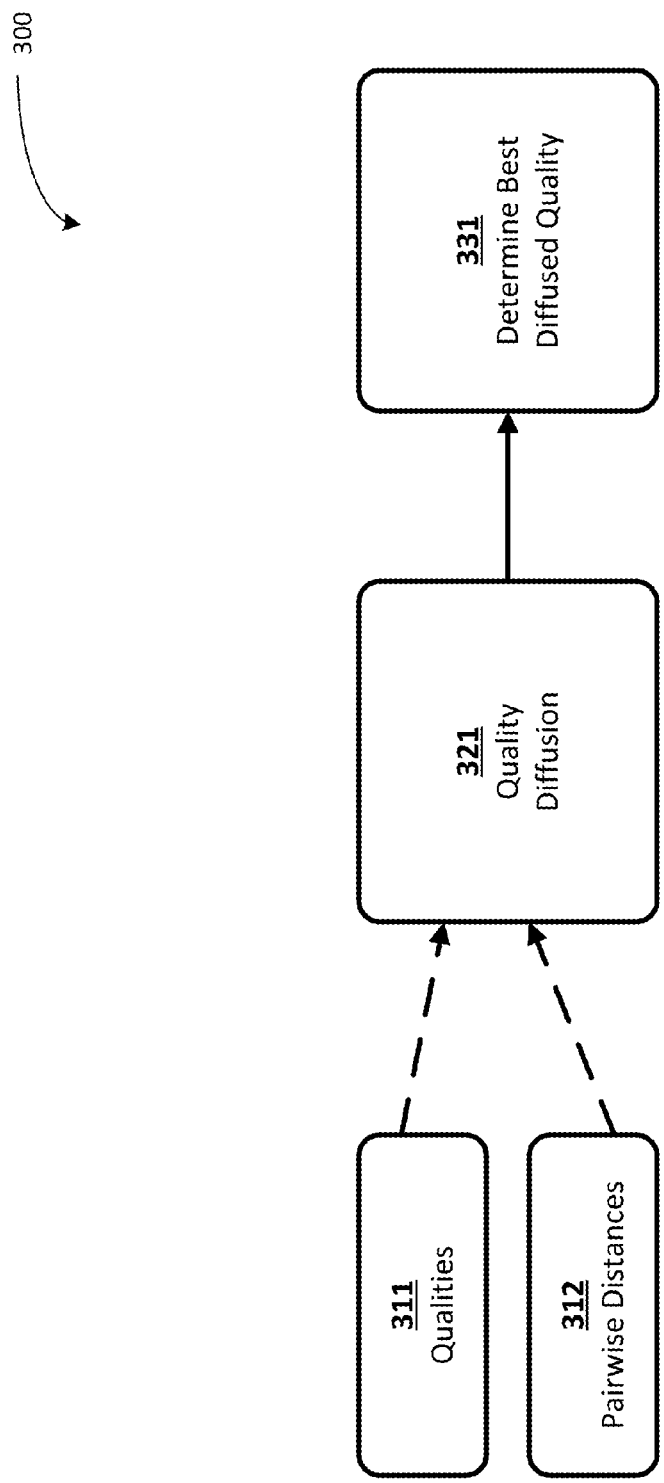
FIG. 3 is a flow diagram 300 illustrating selection of representatives for content clusters based on diffusion, according to an example implementation.

Once content has been clustered, a next step is to choose a representative of each cluster to participate further in the selection processes. According to certain implementations, a quality diffusion may be used to select a representative for each cluster. FIG. 3 is a flow diagram 300 illustrating selection of representatives for content clusters based on diffusion, according to an example implementation. As shown in FIG. 3, a determined quality diffusion 321 for a segment may be based on a quality 311 of the segment, and a distance to 312 its neighbor elements in the same cluster. In some implementations, the segment with the highest or best diffused value may be chosen as a cluster representative 331.

An example procedure for such selection by diffusion follows:

```
For each element I
    For each neighbor j of i
        diffusion_constant = (dist[i][j] + normalization_parameter) * (dist[i][j] + normalization_parameter);
        diffused_qual[i] += qual[i] * qual[j]/diffusion_constant;
    end loop
end loop
representative = arg max diffused_quality[ ].
```

In some implementations, the normalization parameter may be chosen empirically and used to balance the coverage and quality. Intuitively speaking, each input element "diffuses" its quality to the neighbors and each element's resultant quality is the aggregated diffused values from all its neighbors. For example, if an element has very high quality and close-in-distance neighbors, then that element may be rewarded more. An element that has no high quality neighbors may be rewarded less. As a result, a representative element selected based on diffusion may represent a cluster with improved consideration of both quality and coverage. In one example, if a cluster contains five similar elements of quality 0.5 and a sixth element which is a little different than the five elements but has a quality is 0.6, the better representative may be from the first five elements.

Selecting Among Cluster Representatives

Figure 4:
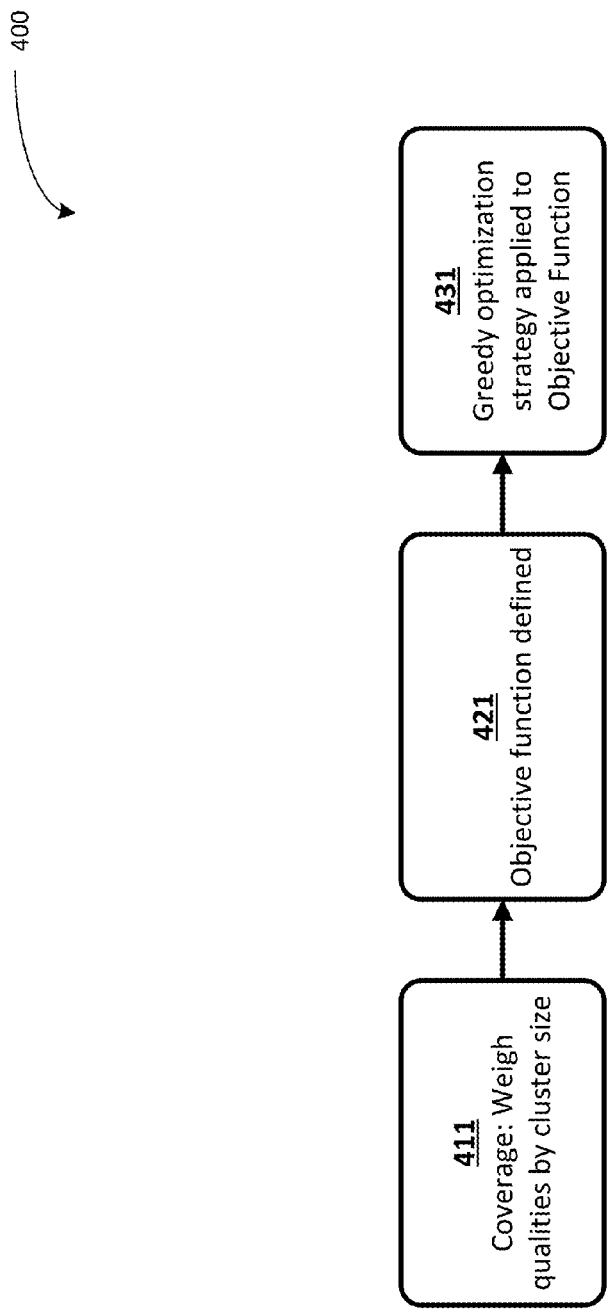
FIG. 4 is a flow diagram 400 illustrating selection among representative segments for inclusion in a content summary, according to an example implementation.

FIG. 4 is a flow diagram 400 illustrating selection among representative segments for inclusion in a content summary, according to an example implementation. In some implementations, once a representative has been selected for each cluster, as shown in FIG. 3, a subset of the cluster representatives may be chosen for inclusion in the content summary. An example procedure for such selection follows:

1. Each cluster representative's quality is weighted by a parameter that is determined by the size of the cluster that it represents, as shown in block 411. The larger the cluster, the higher the quality becomes. Thus, coverage may be rewarded.
2. An objective function is declared that when maximized will increase the quality and diversity of the elements, as shown in block 421.
3. A greedy optimization strategy is used to maximize the objective function, as shown in block 431.

In some implementations, the objective function may be defined to reward coverage and diversity as follows:

For rewarding coverage: $qual_{new}[i]=f(clustersize)*qual[i]$. The larger the cluster, larger the value of f.

For rewarding diversity, there may be two types of diversity defined:

Type 0 may be based on distance from the nearest neighbor. $diversity=\Sigma_{i \in S}\min_{j \in S\setminus i} d(i,j)$ Type 1 may be based on aggregate distances from all the neighbors. $diversity=\Sigma_{i \in S}\Sigma_{j \in S\setminus i}d(i,j)$ Based on these definitions, the objective function (take type 0 diversity, for example) may be defined as:

$\max_{s \in S}\Sigma_{i \in S}\min_{j \in S\setminus i}d(i,j)+\lambda_{i \in S}qual_{new}[i]$, where λ is a parameter to balance the quality and diversity. Note that the quality here is already weighted for coverage. The objective function may be maximized for the required number of subset elements.

In some implementations, a greedy elimination strategy may be used to find a solution. In other words, a worst element is eliminated from the pool until the desired number of elements needed is reached. An example procedure for such a greedy strategy follows:

1. S={1, 2, . . . , N}; // start with all the cluster owners;
2. while |S|>required number of elements, then:
   a. find the "worst" element that minimizes the loss, $$i = \underset{i \in S}{\arg\min} \min_{j \in S\setminus i} d(i + j) + \lambda qual_{new}[i]$$

b. S=S\i;
3. Return S.

Manual User Constraints

According to certain implementations, manually edited or user selectable constraints may be used with the disclosed techniques. Manually edited constraints may include two categories, inclusions and exclusions. Exclusions may be photos clips, or other elements that a user has explicitly removed or flagged for non-inclusion in a content summary. Inclusions may be elements that a user has marked or otherwise indicated for inclusion in a content summary.

In some implementations, further inclusions or exclusions may be made automatically based on manually edited constraints. For example, elements determined to be similar to a manually excluded element may also be excluded from a content summary. In another implementation, an exclusion or inclusion may be implied based on manual user activity. For example, clips that a user has explicitly added or manually edited may be automatically considered inclusions. In another example, photos tagged as containing nudity or inappropriate content may be automatically considered exclusions.

According to certain implementations, exclusions may be screened or removed from an input content set before clustering and thus exempt from the remainder of the content summarization process. Moreover, any clip or segment that overlaps with an exclusion element may also be left out. In another implementation, exclusions may be present for clustering. However, once clusters are determined, all other elements belonging to a cluster containing an exclusion element may also be excluded. Thus, elements determined to be similar to a manually excluded segment may also be excluded.

According to certain implementations, inclusion elements may be automatically made representatives of their respective clusters. Accordingly, duplicates or elements redundant to the inclusion element may be prevented from appearing in the summary without compromising coverage.

In some implementations, inclusion elements may be treated normally during clustering. However, if more than one inclusion element is grouped in a single cluster, then the single cluster may be divided into or redefined as several sub-clusters with each sub-cluster having one inclusion element. The other elements of the original cluster may be assigned to the sub-cluster with the nearest or most similar inclusion.

In another implementation, a first element that overlaps most with each inclusion element may be replaced by the inclusion element. The quality and distance metrics may be transferred to the inclusion element from the overlapping element being replaced.

In some implementations, during post-clustering selection, inclusion elements may be selected ahead of normal cluster representatives. Cluster representatives determined to be similar to inclusion clips also be less preferred over cluster representatives.

In another implementation, an inclusion element may be nonetheless excluded from a summary if it fails to meet certain criteria, such as a minimum length. In another implementation, global criteria such as a minimum required quality may not apply to inclusion elements. In another implementation, where an inclusion element and an exclusion element overlap, the inclusion element may override the exclusion.

In yet another implementation, both inclusions and exclusions may be enforced or ignored based on how they change a duration of a generated summary.

Figure 5:
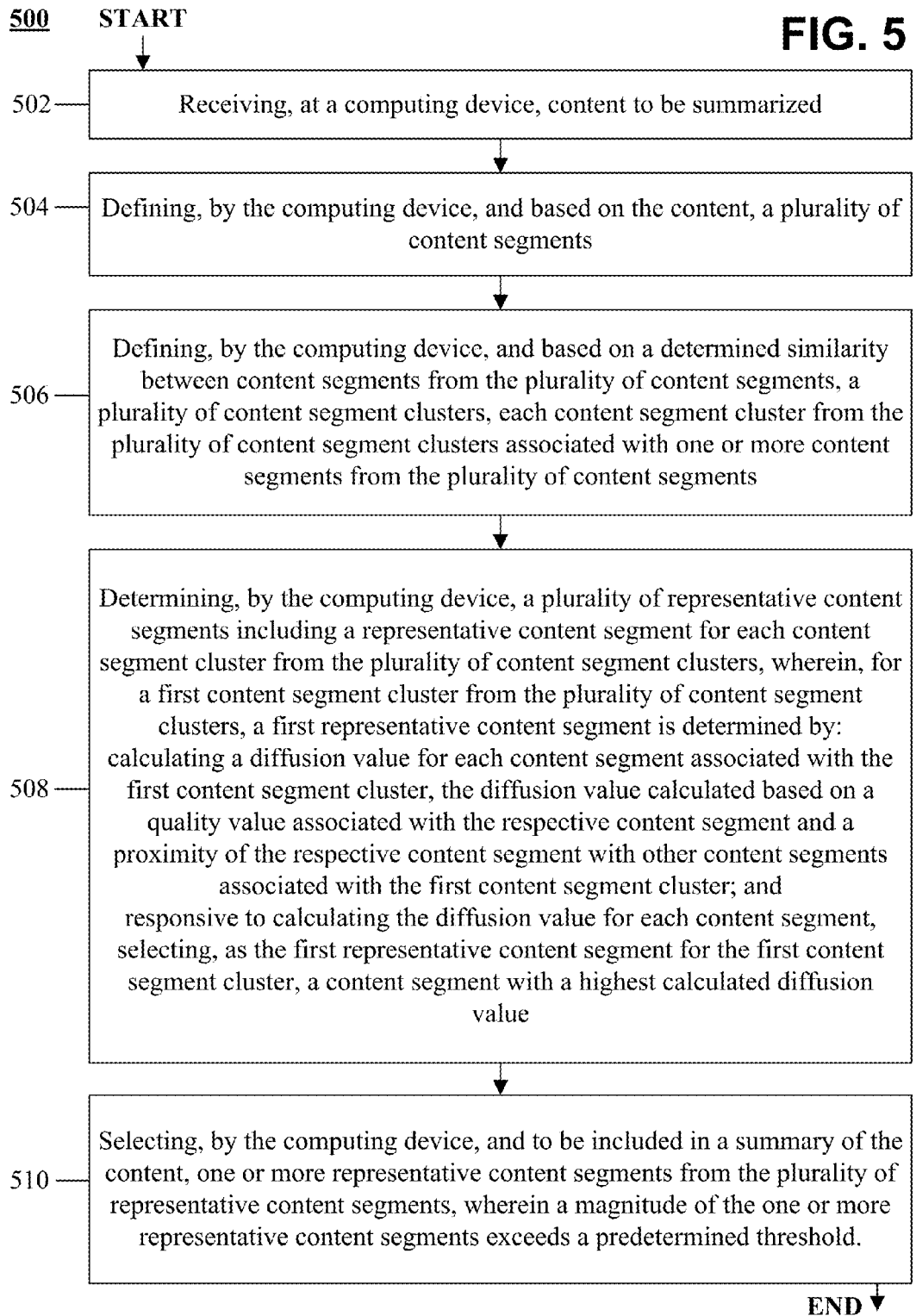
FIG. 5 is a flow diagram of a method 500 for providing improved content coverage in automatically-generated content summaries.

FIG. 5 is a flow diagram of a method 500 for providing improved content coverage in automatically-generated content summaries As shown in FIG. 5, the method 500 starts in block 502, and, according to an example implementation, includes receiving, at a computing device, content to be summarized. In block 504, the method 500 includes defining, by the computing device, and based on the content, a plurality of content segments. In block 506, the method 500 includes defining, by the computing device, and based on a determined similarity between content segments from the plurality of content segments, a plurality of content segment clusters, each content segment cluster from the plurality of content segment clusters associated with one or more content segments from the plurality of content segments.

In block 508, the method 500 includes determining, by the computing device, a plurality of representative content segments including a representative content segment for each content segment cluster from the plurality of content segment clusters, wherein, for a first content segment cluster from the plurality of content segment clusters, a first representative content segment is determined by: calculating a diffusion value for each content segment associated with the first content segment cluster, the diffusion value calculated based on a quality value associated with the respective content segment and a proximity of the respective content segment with other content segments associated with the first content segment cluster; and responsive to calculating the diffusion value for each content segment, selecting, as the first representative content segment for the first content segment cluster, the content segment with a highest calculated diffusion value.

In block 510, the method 500 includes selecting, by the computing device, and to be included in a summary of the content, one or more representative content segments from the plurality of representative content segments, wherein a magnitude of the one or more representative content segments exceeds a predetermined threshold It will be understood that the various steps shown in FIG. 5 are illustrative only, and that steps may be removed, other steps may be used, or the order of steps may be modified.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method comprising:
   receiving, at a computing device, content to be summarized;
   defining, by the computing device, and based on the content, a plurality of content segments;
   defining, by the computing device, and based on a determined similarity between content segments from the plurality of content segments, a plurality of content segment clusters, each content segment cluster from the plurality of content segment clusters associated with one or more content segments from the plurality of content segments;
   determining, by the computing device, a plurality of representative content segments including a representative content segment for each content segment cluster from the plurality of content segment clusters, wherein, for a first content segment cluster from the plurality of content segment clusters, a first representative content segment is determined by:
      calculating a diffusion value for each content segment associated with the first content segment cluster, the diffusion value calculated based on a quality value associated with the respective content segment and a proximity of the respective content segment with other content segments associated with the first content segment cluster; and
      responsive to calculating the diffusion value for each content segment, selecting, as the first representative content segment for the first content segment cluster, a content segment with a highest calculated diffusion value;
   selecting, by the computing device, and to be included in a summary of the content, one or more representative content segments from the plurality of representative content segments, wherein a magnitude of the one or more representative content segments exceeds a predetermined threshold; and
   outputting, for display, the summary of the content wherein the summary of the content comprises the one or more selected representative content segments.

2. The method of claim 1, wherein:
   the quality value associated with each content segment is based on one or more of detected motion, detected faces, recognized objects, colorfulness, fidelity of content segment, or accompanying audio to the content segment.

3. The method of claim 1, wherein the selecting the one or more representative content segments to be included in the summary of the content is based on a greedy strategy.

4. The method of claim 1, further comprising:
   receiving, at the computing device, an indication of one or more content segments from the plurality of content segments to be excluded from the summary of the content; and
   removing from the plurality of content segments, before defining the plurality of content segment clusters, the one or more content segments to be excluded.

5. The method of claim 4, further comprising:
   removing, from the plurality of content segments, content segments that overlap with a content segment from the one or more content segments to be excluded from the summary of the content.

6. The method of claim 5, further comprising:
   receiving, at the computing device, an indication of one or more content segments from the plurality of content segments to be included in the summary of the content, wherein the removing the one or more content segments to be excluded does not include removal of any content segments that also overlap with a particular content segment from the one or more content segments to be included in the summary of the content.

7. The method of claim 1, further comprising:
   receiving, at the computing device, an indication of one or more content segments from the plurality of content segments to be excluded from the summary of the content, wherein the one or more representative content segments to be included in the summary of the content does not include content segments from any content segment cluster associated with a content segment from the one or more content segments to be excluded from the summary of the content.

8. A computer program product comprising a non-transitory computer readable medium that stores instructions that, when executed by a computing device, cause the computing device to perform a method comprising:
   receiving, at the computing device, content to be summarized;
   defining, by the computing device, and based on the content, a plurality of content segments;
   defining, by the computing device, and based on a determined similarity between content segments from the plurality of content segments, a plurality of content segment clusters, each content segment cluster from the plurality of content segment clusters associated with one or more content segments from the plurality of content segments;
   determining, by the computing device, a plurality of representative content segments including a representative content segment for each content segment cluster from the plurality of content segment clusters, wherein, for a first content segment cluster from the plurality of content segment clusters, a first representative content segment is determined by:
      calculating a diffusion value for each content segment associated with the first content segment cluster, the diffusion value calculated based on a quality value associated with the respective content segment and a proximity of the respective content segment with other content segments associated with the first content segment cluster; and responsive to calculating the diffusion value for each content segment, selecting, as the first representative content segment for the first content segment cluster, the content segment with a highest calculated diffusion value;

selecting, by the computing device, and to be included in a summary of the content, one or more representative content segments from the plurality of representative content segments; and outputting, for display, the summary of the content wherein the summary of the content comprises the one or more selected representative content segments.

9. The computer program product of claim 8, wherein:
the quality value associated with each content segment is based on one or more of detected motion, detected faces, recognized objects, colorfulness, fidelity of content segment, or accompanying audio to the content segment.

10. The computer program product of claim 8, wherein the selecting the one or more representative content segments to be included in the summary of the content is based on a greedy strategy.

11. The computer program product of claim 8, the method further comprising:
receiving, at the computing device, an indication of one or more content segments from the plurality of content segments to be included in the summary of the content, and, for each content segment cluster comprising a content segment from the one or more content segments to be included, the representative content segment for the respective content segment cluster being a content segment from the one or more content segments to be included.

12. The computer program product of claim 11, wherein:
representative content segments, that are content segments from the one or more content segments to be included, are given priority over other representative content segments from the plurality of representative content segments in the selecting of the one or more representative content segments to be included.

13. The computer program product of claim 8, the method further comprising:
receiving, at the computing device, an indication of one or more content segments from the plurality of content segments to be included in the summary of the content, and, for each content segment cluster comprising a content segment from the one or more content segments to be included in the summary of the content, the representative content segment for the respective content segment cluster being:
a content segment from the one or more content segments to be included the summary of the content, or
a content segment, associated with the respective content cluster, that most overlaps with the content segment from the one or more content segments to be included in the summary of the content.

14. The computer program product of claim 8, further comprising:
receiving, at the computing device, an indication of one or more content segments from the plurality of content segments to be included in the summary of the content; and
responsive to defining the plurality of content clusters, defining, by the computing device, and for each content cluster associated with two or more content segments from the one or more content segments to be included in the summary of the content, two or more sub-clusters, each sub-cluster from the two or more sub-clusters associated with one of the two more content segments from the one or more content segments to be included in the summary of the content; and
associating, for each other content segment associated with the content segment cluster, the respective other content segment with a sub-cluster of the two or more sub-clusters that is associated with a content segment to be included in the summary of the content that is closest in proximity to the respective content segment.

15. A system comprising:
at least one memory operatively coupled to a computing device and configured for storing data and instructions that, when executed by the computing device, cause the computing device to perform a method comprising:
receiving, at the computing device, a plurality of content segments representing content to be summarized;
defining, by the computing device, and based on a determined similarity between content segments from the plurality of content segments, a plurality of content segment clusters, each content segment cluster from the plurality of content segment clusters associated with one or more content segments from the plurality of content segments;
determining, by the computing device, a plurality of representative content segments including a representative content segment for each content segment cluster from the plurality of content segment clusters, wherein, for a first content segment cluster from the plurality of content segment clusters, a first representative content segment is determined by:
calculating a diffusion value for each content segment associated with the first content segment cluster, the diffusion value calculated based on a quality value associated with the respective content segment and a proximity of the respective content segment with other content segments associated with the first content segment cluster; and
responsive to calculating the diffusion value for each content segment, selecting, as the first representative content segment for the first content segment cluster, the content segment with a highest calculated diffusion value;
selecting, by the computing device, and to be included in a summary of the content, one or more representative content segments from the plurality of representative content segments, wherein a magnitude of the one or more representative content segments exceeds a predetermined threshold; and
outputting, for display, the summary of the content wherein the summary of the content comprises the one or more selected representative content segments.

16. The system of claim 15, wherein:
the quality value associated with each content segment is based on one or more of detected motion, detected faces, recognized objects, colorfulness, fidelity of content segment, or accompanying audio to the content segment.

17. The system of claim 15, wherein the selecting the one or more representative content segments to be included in the summary of the content is based on a greedy strategy.

18. The system of claim 1, the method further comprising:
   receiving, at the computing device, an indication of one or more content segments from the plurality of content segments to be excluded from the summary of the content; and
   removing from the plurality of content segments, before defining the plurality of content segment clusters, the one or more content segments to be excluded.

19. The system of claim 18, the method further comprising:
   removing, from the plurality of content segments, content segments that overlap with a content segment from the one or more content segments to be excluded from the summary of the content.

20. The system of claim 19, further comprising:
   receiving, at the computing device, an indication of one or more content segments from the plurality of content segments to be included in the summary of the content,
   wherein the removing the one or more content segments to be excluded does not include removal of any content segments that also overlap with a particular content segment from the one or more content segments to be included in the summary of the content.

* * * * *